United States Patent [19]
Crouse et al.

[11] Patent Number: 5,444,214
[45] Date of Patent: Aug. 22, 1995

[54] APPARATUS AND METHOD FOR SYNCHRONIZING A FIRING CIRCUIT FOR A BRUSHLESS ALTERNATOR RECTIFIED D. C. WELDER

[75] Inventors: Edward M. Crouse, Euclid; Denis M. Osowski, Parma, both of Ohio

[73] Assignee: The Lincoln Electric Company, Cleveland, Ohio

[21] Appl. No.: 161,595

[22] Filed: Dec. 6, 1993

[51] Int. Cl.⁶ ................................................ B23K 9/10
[52] U.S. Cl. ...................................... 219/133; 322/90
[58] Field of Search ................ 219/133, 134, 137 PS; 322/32, 37, 90

[56] References Cited

U.S. PATENT DOCUMENTS

| | | |
|---|---|---|
| 3,335,291 | 8/1967 | Gutzwiller . |
| 3,337,769 | 8/1967 | Buchanan . |
| 3,351,843 | 11/1967 | Tipton . |
| 3,424,970 | 1/1969 | Ross . |
| 3,522,449 | 8/1970 | McMurtrie . |
| 3,611,097 | 10/1971 | Joslyn . |
| 3,704,408 | 11/1972 | Schroeder . |
| 3,772,603 | 11/1973 | Drushel . |
| 3,849,719 | 11/1974 | Geiersbach . |
| 3,862,439 | 1/1975 | Coccio . |
| 3,863,134 | 1/1975 | Pollard . |
| 3,879,652 | 4/1975 | Billings . |
| 3,883,714 | 5/1975 | James . |
| 3,914,625 | 10/1975 | Billings . |
| 4,071,885 | 1/1978 | Bilczo . |
| 4,314,195 | 2/1982 | Muter . |
| 4,533,863 | 8/1985 | Luhn . |
| 4,561,059 | 12/1985 | Davis et al. . |
| 4,572,973 | 2/1986 | Tanaka . |
| 4,604,517 | 8/1986 | Barry . |
| 4,622,478 | 11/1986 | Ise et al. . |
| 4,672,301 | 6/1987 | Westfall . |
| 4,751,629 | 6/1988 | Shimizu . |
| 4,791,545 | 12/1988 | Hinckley . |

OTHER PUBLICATIONS

1985—"Electric Machinery Fundamentals" by Stephen J. Chapman, McGraw-Hill p. 555–560.
1971—"Thyristor Phase-Controlled Convertors and Cycloconvertors," B. R. Pelly, Wiley-Interscience (1971) pp. 229–277.

*Primary Examiner*—Clifford C. Shaw
*Attorney, Agent, or Firm*—Vickers, Daniels & Young

[57] ABSTRACT

An engine-driven, multiple-phase, alternator-powered SCR rectified arc welding power supply using a single synchronizing winding within the alternator providing signals to a synchronizing digitizer which masks noise for most of each cycle of the alternator. The synchronizing circuitry prevents spurious synchronizing signals.

48 Claims, 4 Drawing Sheets

APPARATUS AND METHOD FOR SYNCHRONIZING A FIRING CIRCUIT FOR A BRUSHLESS ALTERNATOR RECTIFIED D. C. WELDER

BACKGROUND OF THE INVENTION

This invention relates to engine-driven welding power supplies and more particularly to D.C. welding power supplies using an engine-driven, multiphase alternator providing current to a multiphase thyristor rectifier circuit.

Welding operations often take place on construction sites, at remote sites, and in other locations where a self-contained power supply is advantageous. In such situations, it is common for a gasoline or diesel engine to be used as a prime mover driving an alternator or generator that supplies welding power. One type of power supply uses a gasoline or diesel motor to drive an induction-type, three-phase alternator having a three-phase alternating current output. Three-phase alternating current is a standard form for transmitting power in which alternating current (a sine wave) of about 50 or 60 hertz is provided on three conductors and, sometimes, a neutral. The three-phase power is created by a rotating magnetic field in the alternator that causes current to flow in stationary windings connected to form three phases. The three phases are 120 degrees out of phase with one another and are conventionally referred to as phases A, B and C. By "120 degrees out of phase" it is meant that phase B is one-third of a cycle behind phase A and phase C is one-third of a cycle behind phase B. The phase order is determined by the direction of rotation of the magnetic field which is in turn determined by the direction of rotation of the driving prime mover. An efficient, well-understood type of power transmission is provided.

The three-phase alternating current output is rectified by use of thyristors in a rectifier bridge. The thyristors are fired in a manner which allows the control of welding parameters such as welding current magnitude.

The control of the thyristors in the rectifier circuit requires one to synchronize the firing signal with the cycles of the alternator voltage which forms the input to the thyristor rectifier bridge. This can be difficult because the firing of the thyristors themselves, the operation of the welder and other elements in the system introduce spikes, noise and false transitions into what would ideally be a smooth sine wave thyristor input.

In the past, synchronizing has sometimes been accomplished by obtaining a synchronizing signal from the power output lines of the alternator itself. The above-described spikes, noise, false transitions and other problems require conditioning of the synchronizing signal to eliminate false synchronizing and mistiming. Another approach provides one dedicated synchronizing winding in the alternator for each phase. Such an approach is expensive as it requires three synchronizing windings for a three-phase power supply. Such an approach also requires conditioning of the output from the synchronizing windings because the noise and spikes and false transitions impressed upon the power lines by operation of the thyristors are often introduced into the magnetic field in the alternator through the alternator power output windings. These anomalies are then picked up by the synchronizing windings. Thus, in addition to the expense of a synchronizing winding for each phase, one must add the expense of conditioning circuitry for each of three phases.

SUMMARY OF THE INVENTION

The present invention provides an engine-driven, D.C. welding current power supply in which synchronizing information is derived from a single synchronizing winding placed in the alternator. Control circuitry and methods take advantage of inherent properties of the alternator power supply to provide synchronizing information to multiple phases based upon the single sensing winding.

Still further in accordance with the invention, this single sensing winding is positioned within the alternator to sense the rotating magnetic field created within the alternator and has a generally sinusoidally varying output signal, which is rectified by a halfwave rectifier and applied to a pulse expander comprised of a capacitor and a resistor and, hence, to a switching network which creates a digital signal having a distinct transition from one binary state to the other binary state which is temporally fixed with relation to a position in the cycle of the synchronizing winding output sine wave. A digital signal is thereby provided having a transition directly related to a precise position in the rotation of the alternator magnetic field and, hence, a precise temporal position with respect to the variations in the alternating power outputs for the three phases in the alternator output.

Still further in accordance with the invention, the digital output from the synchronizing switching network is provided to a digital processor, which adds delay amounts to the transition time and creates firing or triggering pulses to control the thyristors in the rectifier bridge.

Still further in accordance with the invention, the delay amounts introduced by the digital processor are adjustable to control the current and voltage supplied by the welding power supply.

Yet further in accordance with the invention, a method of providing timed firing signals for a thyristor rectifier bridge in a multiphase alternator welding power supply is provided including the steps of providing a single electrically conductive synchronizing winding within the alternator, a rectifier connected to the single winding, a storage capacitor and bleed resistor connected to the rectifier, a switch network connected to the capacitor and resistor, and a digital processor; creating an output signal at the terminals of the winding having repeating cycles and applying this output signal to the rectifier thereby creating a rectified signal; applying the rectified signal to the capacitor and resistor thereby creating an expanded signal; applying the expanded signal to the switch network thereby creating a switched signal having a distinct transition point corresponding to a selected point in the cycles of the output signal; applying this switched signal to the digital processor; and, using the digital processor to create a multiplicity of timed thyristor gating signals adapted to trigger the thyristors and create a desired welding current.

It is the primary object of the present invention to provide an engine-driven, multiphase alternator D.C. welding power supply which requires only a single sensing circuit to provide synchronization information for gating the thyristors rectifying multiphase alternating current output.

It is another object of the present invention to provide a synchronizing circuit for a multiphase alternator-powered D.C. welding circuit which is inexpensive to manufacture and reliable in operation.

It is yet another object of the present invention to provide a motor-driven, alternator-type D.C. welding power supply in which only a single synchronizing signal conditioning circuit is required.

It is yet another object of the present invention to take advantage of the relatively constant rotational speed of a motor-driven, alternator-type D.C. welding power supply to construct three-phase triggering signals from a single-phase synchronizing winding.

It is still a further object of the present invention to provide a gating control circuit for a motor-driven, alternator-type D.C. welding power supply which is easily controlled by means of a digital processor and relatively immune to noise, spikes, glitches, false transitions and the like.

It is still another object of the present invention to provide a D.C. welding power supply of the engine-driven, alternator type which can compensate for and/or recover from missed synchronizing information without undue detrimental effect to a finished weld.

These and other objects and advantages of the invention will become apparent from the following description, the accompanying drawings and the appended claims.

BRIEF DESCRIPTION OF THE DRAWINGS

Referring now to the drawings wherein the showings are made for the purposes of illustrating a preferred embodiment of the invention only and not for the purposes of limiting same, FIG. 1 shows an arc welding power supply A in which an engine 10 is physically connected through a shaft 12 to an alternator 14. The alternator 14 is a three-phase, induction-type brushless alternator having a three-phase welding power output 16, a single-phase auxiliary power output 18 and a single-phase synchronizing (or sync) output 20. The auxiliary power output 18 provides either 120 volt or 240 volt 60 or 50 hertz power depending upon the intended market or buyer desires. The frequency of the auxiliary power is held close to 50 or 60 hertz by means of engine speed control as is conventional. This allows an operator to use the auxiliary power output 18 to run power tools and the like which require a reasonably regular alternating current frequency. The provision of auxiliary power in this manner having these characteristics is conventional.

Figure 1:
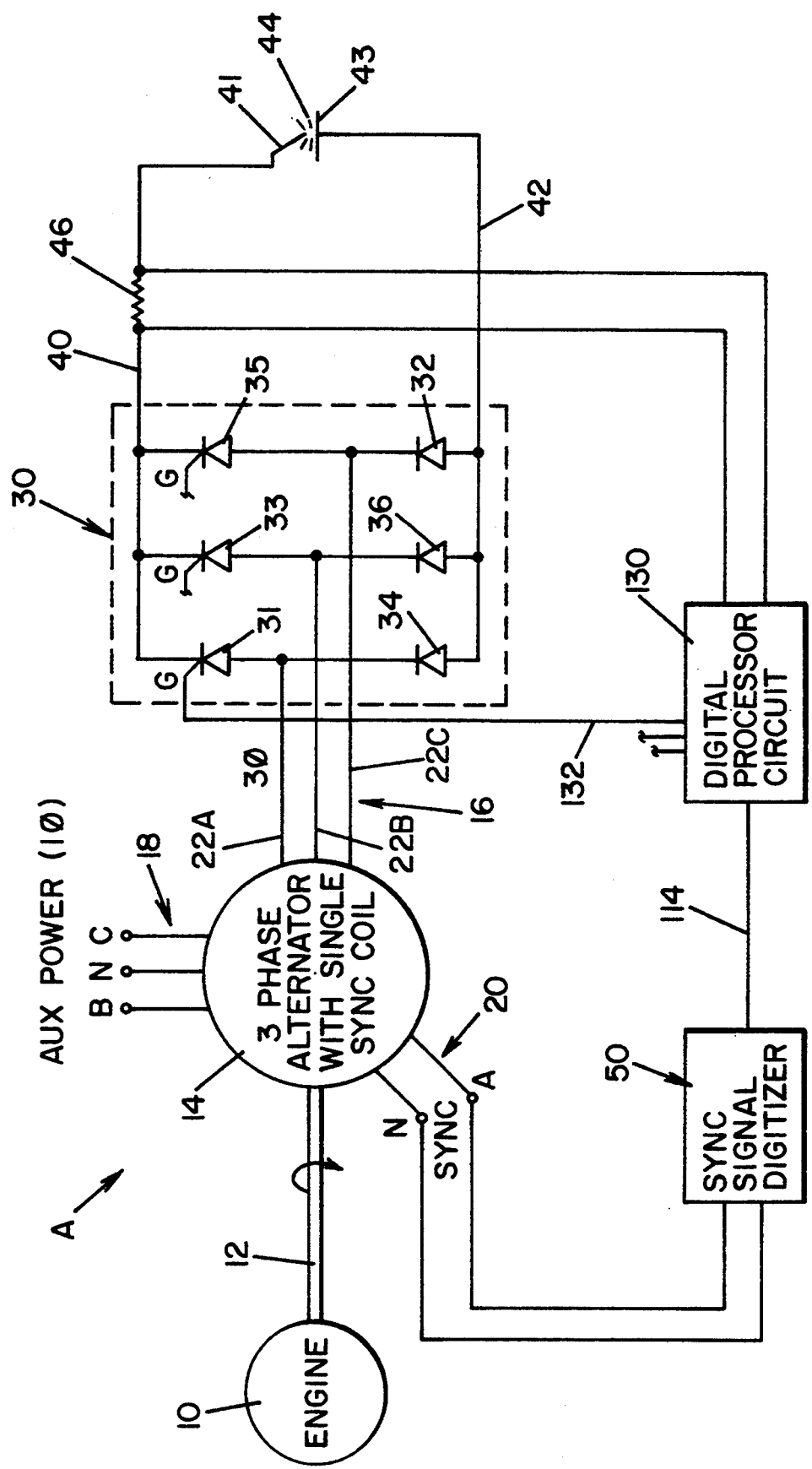
FIG. 1 is a schematic diagram, mostly in block form, of an engine-powered welder including an alternator, rectifier and control circuitry.

The three-phase welding power output is carried on three welding power lines 22A, 22B, 22C. The three phases are conventionally identified as the A phase, B phase and C phase. Assuming the A phase to be leading, the B phase is 120° lagging the A phase and the C phase is 120° lagging the B phase. A symmetrical arrangement is provided in this conventional power system. The three-phase power carried on lines 22A, 22B, 22C is applied to a thyristor rectifier bridge 30. In practice, the rotor of alternator 14 has a squirrel cage winding and capacitors are connected between lines 22A, 22B and 22C for excitation of the rotor winding.

The rectifier bridge 30 is comprised of three semiconductor controlled rectifiers ("SCRs") 31, 33, 35, and three diodes 32, 34, 36. The SCRs each have a gate input used to turn the SCR on and put it in the forward conducting state. The SCRs and diodes are connected in a conventional semi-converter bridge arrangement, each SCR or diode receiving energy from one of the three-phase power lines and being connected to either the D.C. welding power output line 40 or the D.C. welding ground line 42. Filtering elements, such as inductors and/or capacitors, are sometimes added in a conventional manner. The SCR bridge described is well known in the industry. Moreover, alternatives using six SCRs and the like are also available.

The D.C. welding power output 40 is connected to a welding electrode 41 and the D.C. ground 42 is connected to the work piece 43. Of course, the polarity of the electrode and workpiece can be reversed. The two are joined electrically by the arc 44, as is conventional. Arc current is sensed at a current sensing shunt 46 and current magnitude information is conditioned and conveyed to a digital processor circuit 130. The preferred embodiment uses a shunt to sense current but a winding could be used.

The SCRs 31, 33, 35 require gating signals. These gating signals are applied at the gate of each SCR and determine the conduction period of each SCR. By proper control of gating signals, the output current and voltage of the rectifier bridge 30 are controlled. However, the gating signals must be precisely synchronized with the A.C. power applied to the SCRs over lines 22A, 22B, 22C.

Figure 2:
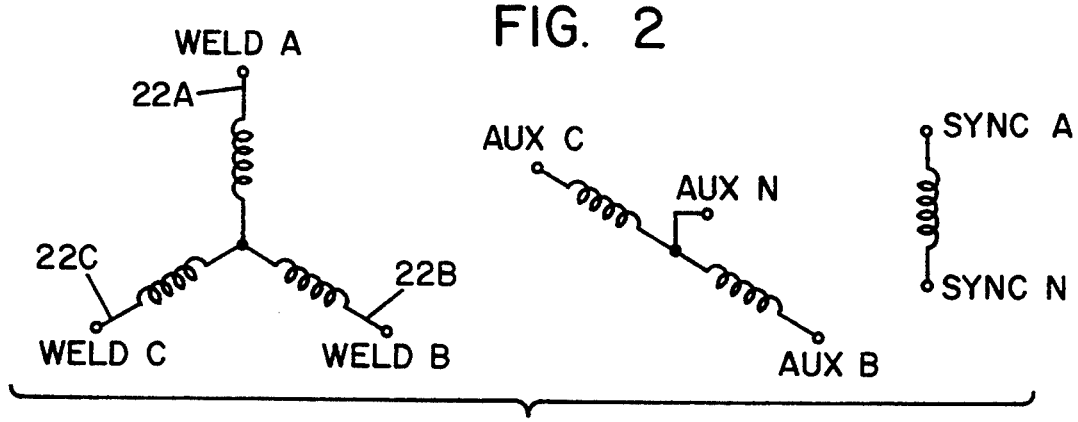
FIG. 2 shows schematically the arrangement of power and sensing windings in the alternator of FIG. 1.

FIG. 2 is a schematic of the windings in the alternator 14. As is conventional, a three-phase winding interconnecting 22A, 22B, 22C provides three-phase welding power when the shaft in the alternator is rotated to create a rotating magnetic field. The windings are physically arranged in a conventional manner to provide three phases 120° apart from one another. The auxiliary windings interconnecting points AUX B, AUX N and AUX C conventionally provide either 120 volt power between AUX N and AUX B and also AUX N and AUX C or 240 volts between AUX B and AUX C. The windings are not necessarily providing two phases of three-phase power. Such providing of auxiliary power is conventional.

A single winding between points SYNC A and SYNC N provides a single-phase A.C. output on the sync lines of the alternator. This winding can be of small diameter wire as it is providing only sensing information and power for the control circuit to which it is connected. Moreover, as it is only a single phase, it can be wound in slot space left open in the auxiliary winding pattern. A minimum of slot space is required. The single-phase sync winding provides an alternating voltage sinusoid having a fixed temporal relationship to the rotating magnetic field within the alternator. The rotating magnetic field also induces the welding power current in the windings interconnecting 22A, 22B, 22C. The sync sinusoid will have a fixed temporal relationship to the phasing of the three-phase welding power provided to the controlled rectifier bridge 30. The sync sinusoid will lead or lag each of the welding power sinusoids by a fixed amount of time so long as the engine alternator shaft turns at a constant speed. Even should the speed of the engine 10 change slightly, the signal on the sync lines, SYNC A and SYNC N will still have accurate information on phasing of all three power lines 22A, 22B, 22C because of the inertia and slow changing mechanical nature of the engine and alternator when compared to 60 hertz power.

The sync signal frequency has a fixed relationship to the frequency of rotation of the alternator rotor. For a two pole machine the frequencies will be the same. For a four pole machine, the sync signal frequency will be twice the frequency of rotation of the rotor.

Figure 4:
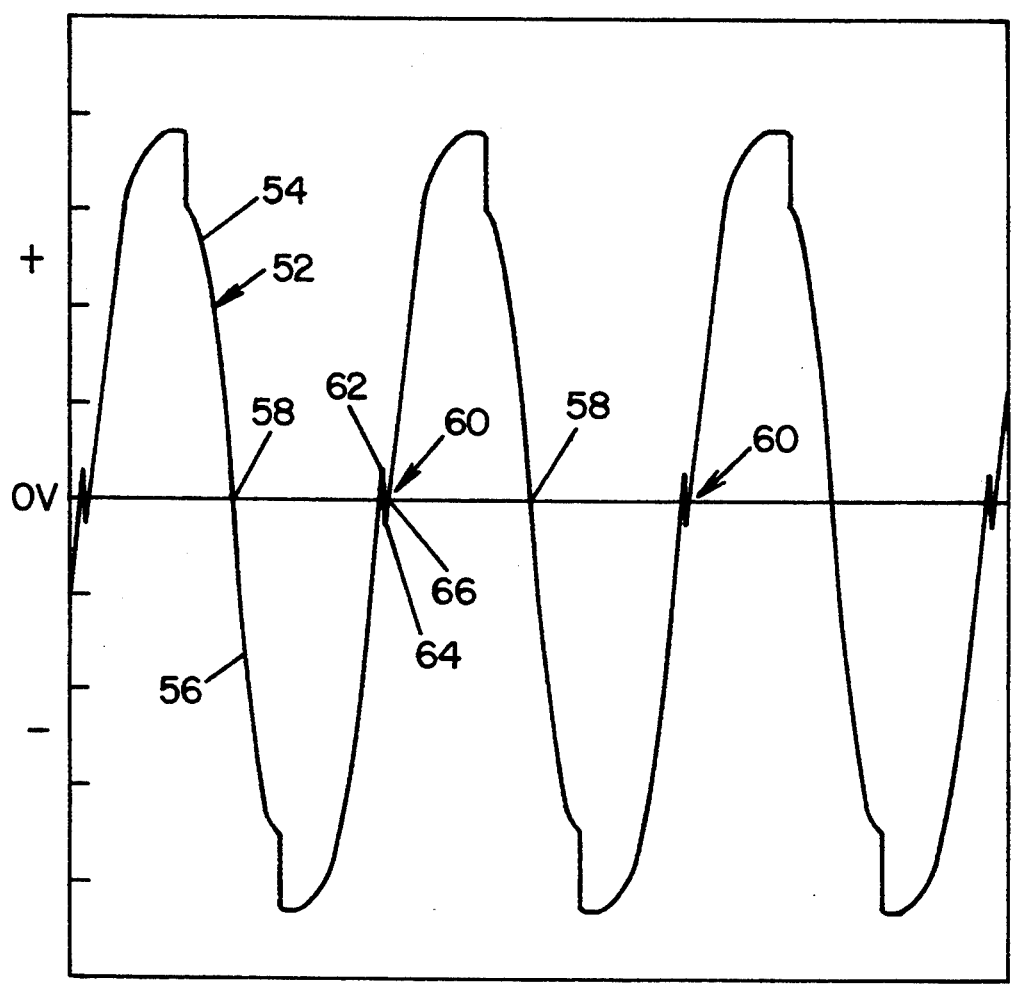
FIG. 4 shows a possible voltage wave shape appearing on the output terminals of the sync winding of FIG. 2 and applied to the input of FIG. 3; and, FIG. 5 shows voltage wave forms at various points in FIG. 3.

The single sync signal provided on SYNC A and SYNC N is provided to the sync signal digitizer 50 (FIG. 1). The synchronizing winding output signal 52 is shown in FIG. 4. The signal is generally sinusoidal having a positive half cycles 54 and a negative half cycles 56. It will contain irregularities caused by switching of the thyristors and other events. The transitions between positive and negative half cycles, the zero crossings, are of particular importance in sensing. In the waveform shown, the negative going zero crossings 58 are relatively clean but the ]positive going zero crossings 60 are noisy. Each positive going zero crossing involves a spurious excursion into positive 62 followed by and excursion into negative 64 and a second positive going zero crossing 66. This waveform is sometimes caused in engine driven rectifier circuits by spikes generated on the power lines by the triggering of the SCRs. Such spikes are fed back to the alternator on lines 22A, 22B, 22C and induce a magnetic field which is picked up by the sensing circuit. In some cases, such spikes fall on a zero crossing (as shown) causing significant problems for control circuitry. Spurious zero crossing can occur at virtually any location within a synchronizing winding output signal. The present invention overcomes the problems associated with these spikes and excursions by effectively masking them in the digitizing circuit.

Figure 3:
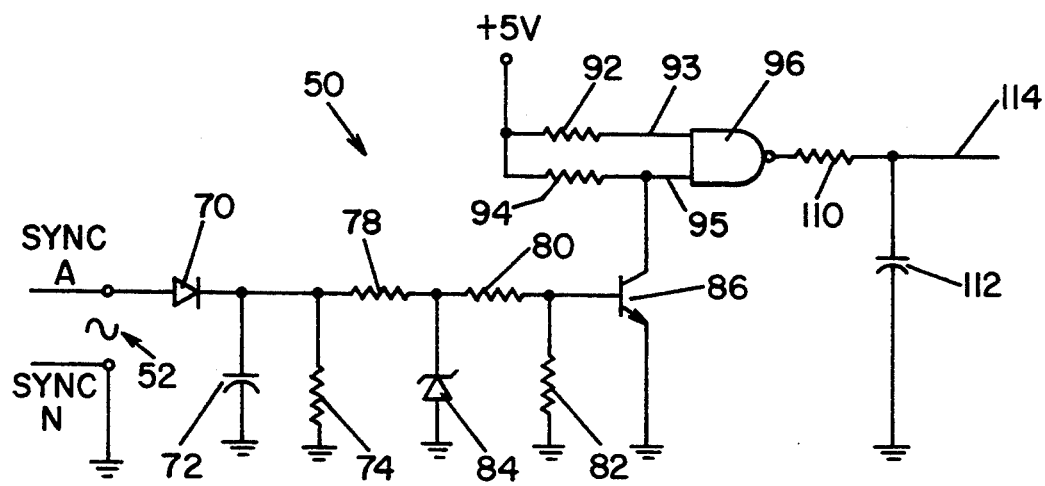
FIG. 3 shows the circuitry used in the synchronizing signal digitizer of FIG. 1.
Figure 5:
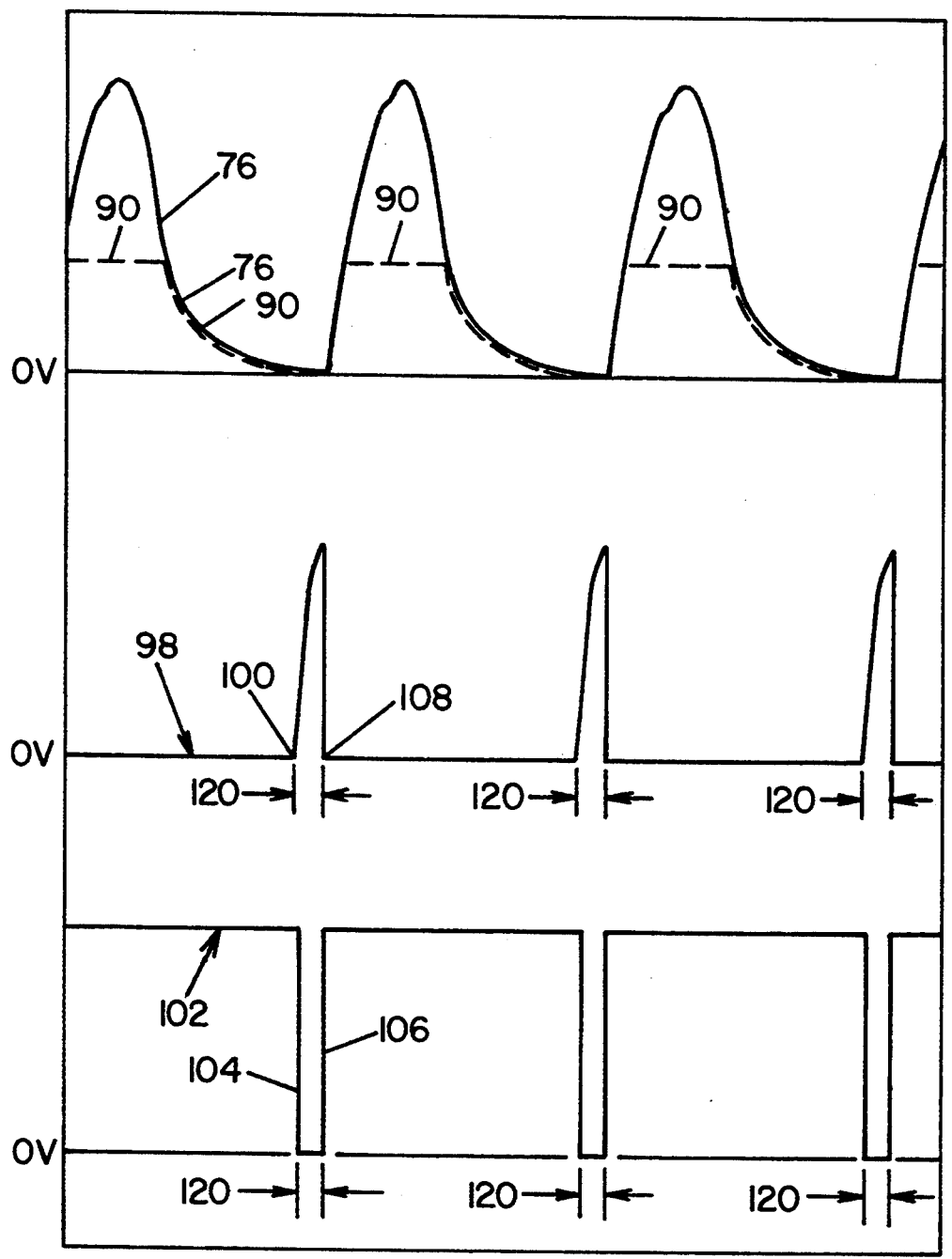

As seen in FIG. 3, the synchronizing winding output signal 52 is applied to a rectifying diode 70 which blocks the negative half cycles 56 and passes the positive half cycles 54. The positive half cycles are applied to a capacitor 72 and a resistor 74 resulting in an extended half cycle signal 76 (FIG. 5). The capacitor 72 is charged by the half cycle and slowly discharges through the resistor 74 resulting in the extension. The extended half cycle signal 76 is passed through relatively small value resistor 78 and applied to a voltage divider comprised of resistors 80, 82. A zener diode 84 clamps the maximum voltage of the extended half cycle signal 76 to a reasonable level forming a clamped extended half cycle signal 90 and protects the remaining circuitry of the sync signal digitizer 50. The clamped extended half cycle signal 90 is applied to the base of an NPN transistor 86. The positive going voltage at the beginning of the extended half cycle signal 76 forward biases the transistor allowing current to flow through the transistor to ground. The resistor 82 assures that the base of the transistor 86 will be pulled low during off times. The transistor will, therefore, not conduct during these periods.

Two resistors 92, 94 are individually connected to the two inputs 93, 95 of a two input NAND gate 96. The resistors 92, 94 are also connected to a source of five volts. The two inputs 93, 95 of the NAND gate are therefore normally held high and the output of the NAND gate is normally zero. The collector of the transistor 86 is connected to one of the inputs of the NAND gate 96. When a positive voltage is applied to the base of the transistor 86, as described above, the transistor conducts and the one input 95 of the NAND gate is drawn low causing the output of the NAND gate to go to logic high.

As can be seen in FIG. 5, the beginning of a positive half cycle 54 in the synchronizing winding output signal 52 initiates a positive going pulse in the extended half cycle signal 76 and the clamped signal 90. This turns the transistor 86 on resulting in the voltage of one of the inputs 95 of the NAND gate 96 to be approximately 0 volts (ground). The NAND gate input signal 98 is seen in FIG. 5. This signal is held low for most of the positive going portion of the clamped extended half cycle signal 90. When the clamped extended half cycle signal 90 falls below the value necessary to forward bias the transistor, the transistor ceases to conduct current and the signal of the input NAND gate goes back to five volts at point 100. Due to the slowly changing voltage applied to the base of the transistor at this point in the cycle, the transistor passes through the active region causing a slow rise of signal 98 at point 100. The output signal of the NAND gate 102 (FIG. 5) is the inverse of the input signal with sharper transitions. As can be seen in FIG. 5, when the input to the NAND gate 98 goes high, the output 102 makes a very fast transition to low 104. When the input to the NAND gate goes low, the output makes a very fast and clean transition to high 106.

When the synchronizing winding output signal 52 first goes high, the positive voltage is passed to the base of the transistor, which is then turned on. The voltage at the transistor's collector, which is the NAND gate input signal 98, is then immediately grounded at the point 108. This results in the NAND output signal 102 immediately going high at a very sharp transition 106. This output is passed through a limiting resistor 110, filtered by a capacitor 112 and applied through line 114 to the digital processor circuit 130. The positive going transition 106 is appropriate as a sync signal for the digital processor.

Because the diode 70 allows only positive going voltage to pass, even a small amount of initial positive going signal will charge the capacitor 72 sufficiently to hold the transistor 86 in the conduction state. Negative going voltage spikes are blocked by the diode 70. As the positive going half cycle 54 continues, the charge on the capacitor 72 is increased. The voltage peaks at about the same time as the peak of positive going half cycle 54 on the synchronization winding output signal 52. Because the charge on the capacitor can only drain away slowly through the bleed resistor 74, the transistor is held in the conduction state. Negative going spikes and other glitches in the synchronizing winding output signal 52 have no effect. The sync signal digitizer 50 is effectively locked in this state until the capacitor has time to drain its charge through the bleed resistor 74. The values of the capacitors 72 and the bleed resistor 74 are selected so that the charge of the capacitor remains sufficiently high to keep the transistor conducting until just before the start of the next positive going half cycle 54. This time constant is known as the frequency of the alternator is known. Thus, the digitizer is only reset and ready to accept input for a short interval 120 just prior to an expected positive going zero crossing 60.

The sync signal digitizer effectively masks spurious inputs for most of the time and, during the period in which it is not masked, it will act upon the first input received. Clean, digitally-acceptable synchronizing transitions are thereby produced.

As described, the NAND gate output signal 102 carrying the transition to high 106 used as a synchronizing signal is applied to the digital processor circuit 130. The digital processor circuit 130 also receives other sensed information such as the current signal received from the arc current sensing shunt or winding 46 and a user set desired current value. The digital processor 130 adds appropriate time delays to the sync signal transition to high 106 and applies gating pulses to the gates of the SCRs 31, 33, 35 through several gating lines 132. The digital gating pulses are conditioned at the digital processor circuit 130 and made appropriate for direct application to the SCR gates G. An individual gating line 132 is provided for each SCR in the bridge.

The digital processor circuit 130 also adjusts the timing of the gating signals to control the current output voltage and other welding parameter as selected by the operator. Techniques for accomplishing this in either analog or digital circuitry are well known.

The above described sync signal digitizer and signal synchronizing winding output can be used with rectifier bridges employing 6 SCRs, 3 SCRs or other rectifier arrangements in which gating signals are required. The circuit provides its advantages wherever synchronizing signals are needed to trigger a rectifier which is provided with power by an alternator subject to gating noise. The present invention provides superior results by sensing the rotating magnetic field within the alternator directly and producing one synchronizing pulse per cycle of the rotating magnetic field and masking noise for most of the cycle. Reliable operation is inexpensively obtained.

The present invention provides a consistent signal indicative of the zero crossing or other characteristic of a voltage signal in one phase of output to the rectifier. Processing circuit 130 then creates the three gating pulses in a preselected spacing. Consistency is required; however, the indication signal need not be specifically clamped to a given point on the voltage signal. Further, a certain amount of drift can be caused by the operating parameters without affecting the overall function of the invention. Indeed, if the signal is created by sensing a spike, there is no damage to the welder. The next created signal corrects the actual timing without damage to the equipment or the workpiece.

Obviously, modifications and alterations to the invention will occur to others upon reading and understanding this specification. It is intended to include all such modifications and alterations insofar as they come within the scope of the appended claims or the equivalents thereof.

Having thus described the invention, it is claimed:

1. A welding power supply comprising:
   a driven shaft;
   a multiphase alternator connected to said shaft, said alternator adapted to create a rotating magnetic field and an alternating multiphase output current;
   a plurality of thyristors connected to receive said alternator output current, having control gate inputs and adapted to create a direct current output;
   a single electrically conductive synchronizing winding within said alternator adapted to sense said rotating magnetic field, said winding adapted to create an output signal dependent on said magnetic field, said output signal being cyclical and having repeating cycles corresponding to a complete revolution of said rotating magnetic field;
   a rectifier connected to said synchronizing winding, said rectifier adapted to receive said output signal, said rectifier adapted to create a unipolar, cyclical rectified signal;
   an expander means adapted to receive said rectified signal and create a unipolar cyclical expanded signal;
   a switch means connected to said expander means, said switch means adapted to receive said expanded signal and create a unipolar cyclical switch signal having a distinct transition point during substantially each said cycle, said transition point having a generally fixed temporal relationship to the cycle of said output signal; and,
   a digital processor adapted to receive said switch signal and create a multiplicity of temporally spaced thyristor gating signals adapted to be applied to said thyristor gates whereby said welding current is controllable.

2. The welding power supply of claim 1 wherein said expander means comprises a storage capacitor connected to said rectifier and a bleed resistor connected to said rectifier and said capacitor.

3. The welding power supply of claim 1 wherein said switch means comprises a transistor and a logic gate, said transistor receiving said expanded signal and being connected to an input of said logic gate, the output of said logic gate being said switch signal.

4. The welding power supply of claim 3 wherein said expanded signal holds said transistor in a first state for a major portion of each cycle, said distinct transition point being a transition from a second state to said first state, whereby creation of spurious transitions from said second state to said first state is avoided.

5. The welding power supply of claim 3 wherein said logic gate is a NAND gate.

6. The welding power supply of claim 3 wherein said switch means includes a voltage divider receiving said expanded signal and applying a divided expanded signal to said transistor.

7. The welding power supply of claim 6 wherein said voltage divider comprises two resistors.

8. The welding power supply of claim 1 wherein said distinct transition point is a transition from a second state to a first state, said switch signal being held in said first state for a major part in each cycle of said switch signal whereby creation of spurious transitions from said second state to said first state is avoided.

9. A method of providing a plurality of temporally spaced firing signals for thyristor rectifiers in a multiphase, brushless alternator welding power supply wherein said alternator has a relatively constant rotational speed and a rotating magnetic field, said method comprising:
   providing a single electrically conductive synchronizing winding within said alternator adapted to sense said rotating magnetic field and having an output signal dependent on said magnetic field, said output signal being cyclical and having repeating cycles corresponding to a complete revolution of said rotating magnetic field;
   rectifying said synchronizing winding output signal to create a rectified signal, said rectified signal being unipolar and cyclical having a non-zero value portion in substantially each cycle;

expanding the duration of said non-zero value portion to create an expanded signal, said expanded signal being unipolar and cyclical;

using said expanded signal to create a switched signal, said switched signal being unipolar, cyclical and having a distinct transition point during substantially each said repeating cycle, said transition point having a generally fixed temporal relationship to the cycle of said output signal;

using said switched signals to create a multiplicity of thyristor gating signals adapted to trigger said thyristors and create a desired welding current; each of said multiplicity of thyristor gating signals being created a calculated time delay after said switched signal transition point.

10. The method of claim 9 wherein said switched signal is restricted to either a first state or a second state and said distinct transition point is a transition from said second state to said first state and said switched signal is held in said first state for a majority of each cycle.

11. The method of claim 10 wherein said switched signal is held in said first state for so long as said expanded signal has a signal value larger in magnitude than a selected value.

12. A welding power supply comprising:
a driven shaft;
an alternator connected to said shaft, said alternator adapted to create a rotating magnetic field and an alternating output current;
at least one thyristor connected to receive said alternator output current, having at least one control gate input and adapted to create a direct current output;
a single electrically conductive synchronizing winding within said alternator adapted to sense said rotating magnetic field, said winding adapted to create an output signal dependent on said magnetic field, said output signal being cyclical and having repeating cycles corresponding to a fraction of a complete revolution of said rotating magnetic field;
a rectifier connected to said synchronizing winding, said rectifier adapted to receive said output signal, said rectifier adapted to create a unipolar, cyclical rectified signal;
an expander means adapted to receive said rectified signal and create a unipolar cyclical expanded signal;
a switch means connected to said expander means, said switch means adapted to receive said expanded signal and create a unipolar cyclical switch signal having a distinct transition point during substantially each said cycle, said transition point having a generally fixed relationship to the cycle of said output signal; and,
a digital processor adapted to receive said switch signal and create a multiplicity of temporally spaced thyristor gating signals adapted to be applied to said thyristor gates whereby said welding current is controllable.

13. The welding power supply of claim 12 wherein said expander means comprises a storage capacitor connected to said rectifier and a bleed resistor connected to said rectifier and said capacitor.

14. The welding power supply of claim 12 wherein said switch means comprises a transistor and a logic gate, said transistor receiving said expanded signal and being connected to an input of said logic gate, the output of said logic gate being said switch signal.

15. The welding power supply of claim 14 wherein said expanded signal holds said transistor in a first state for a major portion of each cycle, said distinct transition point being a transition from a second state to said first state, whereby creation of spurious transitions from said second state to said first state is avoided.

16. The welding power supply of claim 14 wherein said logic gate is a NAND gate.

17. The welding power supply of claim 14 wherein said switch means includes a voltage divider receiving said expanded signal and applying a divided expanded signal to said transistor.

18. The welding power supply of claim 17 wherein said voltage divider comprises two resistors.

19. The welding power supply of claim 12 wherein said distinct transition point is a transition from a second state to a first state, said switch signal being held in said first state for a major part in each cycle of said switch signal whereby creation of spurious transitions from said second state to said first state is avoided.

20. A method of providing a plurality of temporally spaced firing signals for at least one thyristor rectifier in an alternator welding power supply wherein said alternator has a relatively constant rotational speed and a rotating magnetic field, said method comprising:
providing a single electrically conductive synchronizing winding within said alternator adapted to sense said rotating magnetic field and having an output signal dependent on said magnetic field, said output signal being cyclical and having repeating cycles corresponding to a fraction of a complete revolution of said rotating magnetic field;
rectifying said synchronizing winding output signal to create a rectified signal, said rectified signal being unipolar and cyclical having a non-zero value portion in substantially each cycle;
expanding the duration of said non-zero value portion to create an expanded signal, said expanded signal being unipolar and cyclical;
using said expanded signal to create a switched signal, said switched signal being unipolar, cyclical and having a distinct transition point during substantially each said repeating cycle, said transition point having a generally fixed relationship to the cycle of said output signal;
using said switched signals to create at least one thyristor gating signal adapted to trigger said thyristor and create a desired welding current; said thyristor gating signal being created a calculated time delay after said switched signal transition point.

21. The method of claim 20 wherein said switched signal is restricted to either a first state or a second state and said distinct transition point is a transition from said second state to said first state and said switched signal is held in said first state for a majority of each cycle.

22. The method of claim 21 wherein said switched signal is held in said first state for so long as said expanded signal has a signal value larger in magnitude than a selected value.

23. A welding power supply comprising:
a driven shaft;
a multiphase alternator connected to said shaft, said alternator adapted to create a rotating magnetic field and an alternating multiphase output current;
a plurality of thyristors connected to receive said alternator output current, having control gate inputs and adapted to create a direct current output;

a single electrically conductive synchronizing winding within said alternator adapted to sense said rotating magnetic field, said winding adapted to create an output signal dependent on said magnetic field, said output signal being cyclical and having repeating cycles corresponding to a complete revolution of said rotating magnetic field;

a detector connected to said synchronizing winding, said detector adapted to receive said output signal and create a switch signal having a distinct transition point during substantially each said cycle, said transition point having a generally fixed temporal relationship to the cycle of said output signal; and, a digital processor adapted to receive said switch signal and create a multiplicity of temporally spaced thyristor gating signals adapted to be applied to said thyristor gates whereby said welding current is controllable.

24. The welding power supply of claim 23 wherein said distinct transition point is a transition from a second state to a first state, said switch signal being held in said first state for a major part in each cycle of said switch signal whereby creation of spurious transitions from said second state to said first state is avoided.

25. The welding power supply of claim 24 wherein said detector comprises:

a rectifier connected to said synchronizing winding, said rectifier adapted to receive said output signal, said rectifier adapted to create a unipolar, cyclical rectified signal;

an expander means adapted to receive said rectified signal and create a unipolar cyclical expanded signal; and, a switch means connected to said expander means, said switch means adapted to receive said expanded signal and create a unipolar cyclical switch signal having a distinct transition point during substantially each said cycle, said transition point having a generally fixed temporal relationship to the cycle of said output signal.

26. The welding power supply of claim 25 wherein said expander means comprises a storage capacitor connected to said rectifier and a bleed resistor connected to said rectifier and said capacitor.

27. The welding power supply of claim 25 wherein said switch means comprises a transistor and a logic gate, said transistor receiving said expanded signal and being connected to an input of said logic gate, the output of said logic gate being said switch signal.

28. The welding power supply of claim 27 wherein said expanded signal holds said transistor in a first state for a major portion of each cycle, said distinct transition point being a transition from a second state to said first state, whereby creation of spurious transitions from said second state to said first state is avoided.

29. The welding power supply of claim 27 wherein said logic gate is a NAND gate.

30. The welding power supply of claim 27 wherein said switch means includes a voltage divider receiving said expanded signal and applying a divided expanded signal to said transistor.

31. The welding power supply of claim 30 wherein said voltage divider comprises two resistors.

32. A method of providing a plurality of temporally spaced firing signals for thyristor rectifiers in a multiphase alternator welding power supply wherein said alternator has a relatively constant rotational speed and a rotating magnetic field, said method comprising:

providing a single electrically conductive synchronizing winding within said alternator adapted to sense said rotating magnetic field and having an output signal dependent on said magnetic field, said output signal being cyclical and having repeating cycles corresponding to a complete revolution of said rotating magnetic field;

providing a detector adapted to receive said output signal and create a switched signal, said switched signal having a distinct transition point during substantially each said repeating cycle, said transition point having a generally fixed temporal relationship to the cycle of said output signal;

providing a digital processor adapted to receive said switched signal and create a multiplicity of thyristor gating signals adapted to trigger said thyristors and create a desired welding current; each of said multiplicity of thyristor gating signals being created a calculated time delay after said switched signal transition point.

33. The method of claim 32 wherein said switched signal is restricted to either a first state or a second state and said distinct transition point is a transition from said second state to said first state and said switched signal is held in said first state for a majority of each cycle.

34. The method of claim 33 wherein said detector is adapted to rectify said synchronizing winding output signal to create a rectified signal, said rectified signal having a non-zero value portion in substantially each cycle; expanding the duration of said non-zero value portion to create an expanded signal and switching said expanded signal to create said switched signal.

35. The method of claim 34 wherein said switched signal is held in said first state for so long as said expanded signal has a signal value larger in magnitude than a selected value.

36. A welding power supply comprising:

a driven shaft;

a multiphase alternator connected to said shaft, said alternator adapted to create a rotating magnetic field and an alternating multiphase output current;

a plurality of thyristors connected to receive said alternator output current, having control gate inputs and adapted to create a direct current output;

a single electrically conductive synchronizing winding within said alternator adapted to sense said rotating magnetic field, said winding adapted to create an output signal dependent on said magnetic field, said output signal being cyclical and having repeating cycles corresponding to a fraction of a revolution of said rotating magnetic field;

a detector connected to said synchronizing winding, said detector adapted to receive said output signal and create a switch signal having a distinct transition point during substantially each said cycle, said transition point having a generally fixed temporal relationship to the cycle of said output signal; and, a digital processor adapted to receive said switch signal and create a multiplicity of temporally spaced thyristor gating signals adapted to be applied to said thyristor gates whereby said welding current is controllable.

37. The welding power supply of claim 36 wherein said distinct transition point is a transition from a second state to a first state, said switch signal being held in said first state for a major part in each cycle of said switch signal whereby creation of spurious transitions from said second state to said first state is avoided.

38. The welding power supply of claim 37 wherein said detector comprises:
- a rectifier connected to said synchronizing winding, said rectifier adapted to receive said output signal, said rectifier adapted to create a unipolar, cyclical rectified signal;
- an expander means adapted to receive said rectified signal and create a unipolar cyclical expanded signal; and,
- a switch means connected to said expander means, said switch means adapted to receive said expanded signal and create a unipolar cyclical switch signal having a distinct transition point during substantially each said cycle, said transition point having a generally fixed temporal relationship to the cycle of said output signal.

39. The welding power supply of claim 38 wherein said expander means comprises a storage capacitor connected to said rectifier and a bleed resistor connected to said rectifier and said capacitor.

40. The welding power supply of claim 38 wherein said switch means comprises a transistor and a logic gate, said transistor receiving said expanded signal and being connected to an input of said logic gate, the output of said logic gate being said switch signal.

41. The welding power supply of claim 40 wherein said expanded signal holds said transistor in a first state for a major portion of each cycle, said distinct transition point being a transition from a second state to said first state, whereby creation of spurious transitions from said second state to said first state is avoided.

42. The welding power supply of claim 40 wherein said logic gate is a NAND gate.

43. The welding power supply of claim 40 wherein said switch means includes a voltage divider receiving said expanded signal and applying a divided expanded signal to said transistor.

44. The welding power supply of claim 43 wherein said voltage divider comprises two resistors.

45. A method of providing a plurality of temporally spaced firing signals for thyristor rectifiers in a multiphase alternator welding power supply wherein said alternator has a relatively constant rotational speed and a rotating magnetic field, said method comprising:
- providing a single electrically conductive synchronizing winding within said alternator adapted to sense said rotating magnetic field and having an output signal dependent on said magnetic field, said output signal being cyclical and having repeating cycles corresponding to a fraction of a revolution of said rotating magnetic field;
- providing a detector adapted to receive said output signal and create a switched signal, said switched signal having a distinct transition point during substantially each said repeating cycle, said transition point having a generally fixed temporal relationship to the cycle of said output signal;
- providing a digital processor adapted to receive said switched signal and create a multiplicity of thyristor gating signals adapted to trigger said thyristors and create a desired welding current; each of said multiplicity of thyristor gating signals being created a calculated time delay after said switched signal transition point.

46. The method of claim 45 wherein said switched signal is restricted to either a first state or a second state and said distinct transition point is a transition from said second state to said first state and said switched signal is held in said first state for a majority of each cycle.

47. The method of claim 46 wherein said detector is adapted to rectify said synchronizing winding output signal to create a rectified signal, said rectified signal having a non-zero value portion in substantially each cycle; expanding the duration of said non-zero value portion to create an expanded signal and switching said expanded signal to create said switched signal.

48. The method of claim 47 wherein said switched signal is held in said first state for so long as said expanded signal has a signal value larger in magnitude than a selected value.

* * * * *